United States Patent
Ota et al.

(10) Patent No.: US 11,422,298 B2
(45) Date of Patent: Aug. 23, 2022

(54) ELECTRONIC DEVICE

(71) Applicant: Japan Display Inc., Tokyo (JP)

(72) Inventors: Takashi Ota, Tokyo (JP); Kazutaka Nagaoka, Tokyo (JP); Michihide Shibata, Tokyo (JP); Toshihiro Yajima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/184,665

(22) Filed: Feb. 25, 2021

(65) Prior Publication Data

US 2021/0181402 A1    Jun. 17, 2021

Related U.S. Application Data

(63) Continuation of application No. PCT/JP2019/028723, filed on Jul. 22, 2019.

(30) Foreign Application Priority Data

Aug. 30, 2018  (JP) .............................. JP2018-161584

(51) Int. Cl.
   *F21V 8/00*  (2006.01)
   *H04N 5/225*  (2006.01)

(52) U.S. Cl.
   CPC ......... *G02B 6/0051* (2013.01); *G02B 6/0068* (2013.01); *H04N 5/2257* (2013.01)

(58) Field of Classification Search
   CPC .. G02B 6/0051; G02B 6/0011; G02B 6/0068; H04N 5/2257; G03B 17/02; G02F 1/13312; G02F 1/133614; G02F 1/133615; G02F 2201/58; H04M 1/0264; H04M 1/0266; H04M 1/22
   See application file for complete search history.

(56) References Cited

U.S. PATENT DOCUMENTS

| | | | |
|---|---|---|---|
| 10,599,190 B2 * | 3/2020 | Nakamura | H04N 5/2254 |
| 2016/0161664 A1 | 6/2016 | Ishida et al. | |
| 2016/0212311 A1 * | 7/2016 | Mathew | G06F 1/1626 |
| 2017/0053592 A1 | 2/2017 | Shin et al. | |
| 2019/0258112 A1 | 8/2019 | Nagasaki et al. | |

(Continued)

FOREIGN PATENT DOCUMENTS

| | | | |
|---|---|---|---|
| CN | 208384291 U | * | 1/2019 |
| JP | 2017-40908 A | | 2/2017 |

(Continued)

OTHER PUBLICATIONS

Machine translation of CN 208384291 U.*
International Search Report dated Aug. 27, 2019 in PCT/JP2019/028723 filed Jul. 22, 2019, 2 pages.

*Primary Examiner* — Joseph L Williams
*Assistant Examiner* — Jose M Diaz
(74) *Attorney, Agent, or Firm* — Maier & Maier, PLLC

(57) ABSTRACT

According to one embodiment, an electronic device includes a liquid crystal panel and an illumination unit which illuminates the liquid crystal panel. The illumination unit includes a light guide comprising a first side surface, a main surface opposing the liquid crystal panel and an opening made by a notch or a through hole, a first light source opposing to the first side surface, and a second light source provided closer to the opening than to the first light source.

9 Claims, 14 Drawing Sheets

(56) References Cited

U.S. PATENT DOCUMENTS

2020/0050048 A1* 2/2020 Morioka ............ G02F 1/133528
2020/0192013 A1* 6/2020 Oh ....................... G02B 6/0011

FOREIGN PATENT DOCUMENTS

| KR | 10-2018-0043493 A | 4/2018 |
| WO | WO 2015/022887 A1 | 2/2015 |
| WO | WO 2018/083817 A1 | 5/2018 |

* cited by examiner

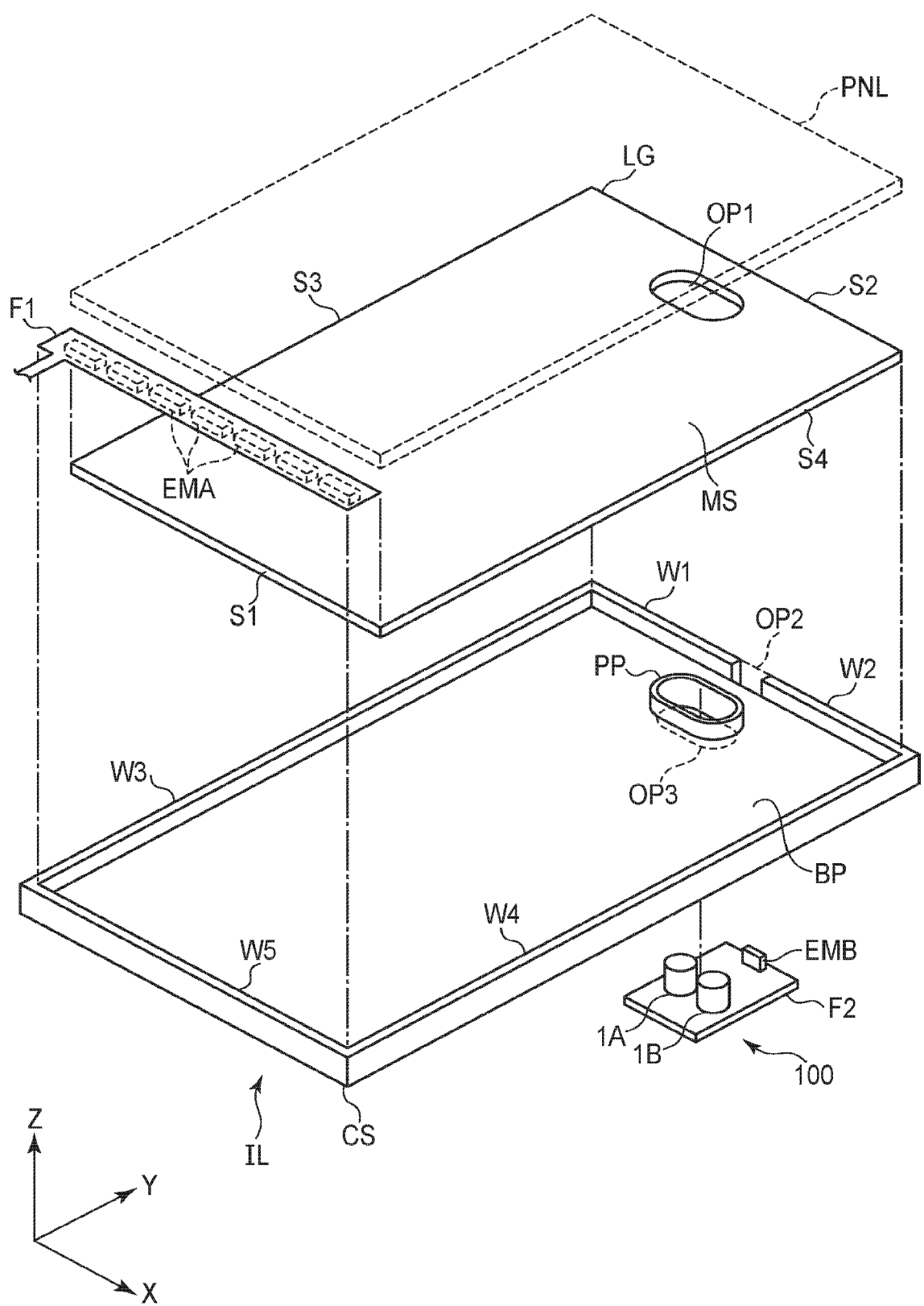
F I G. 1

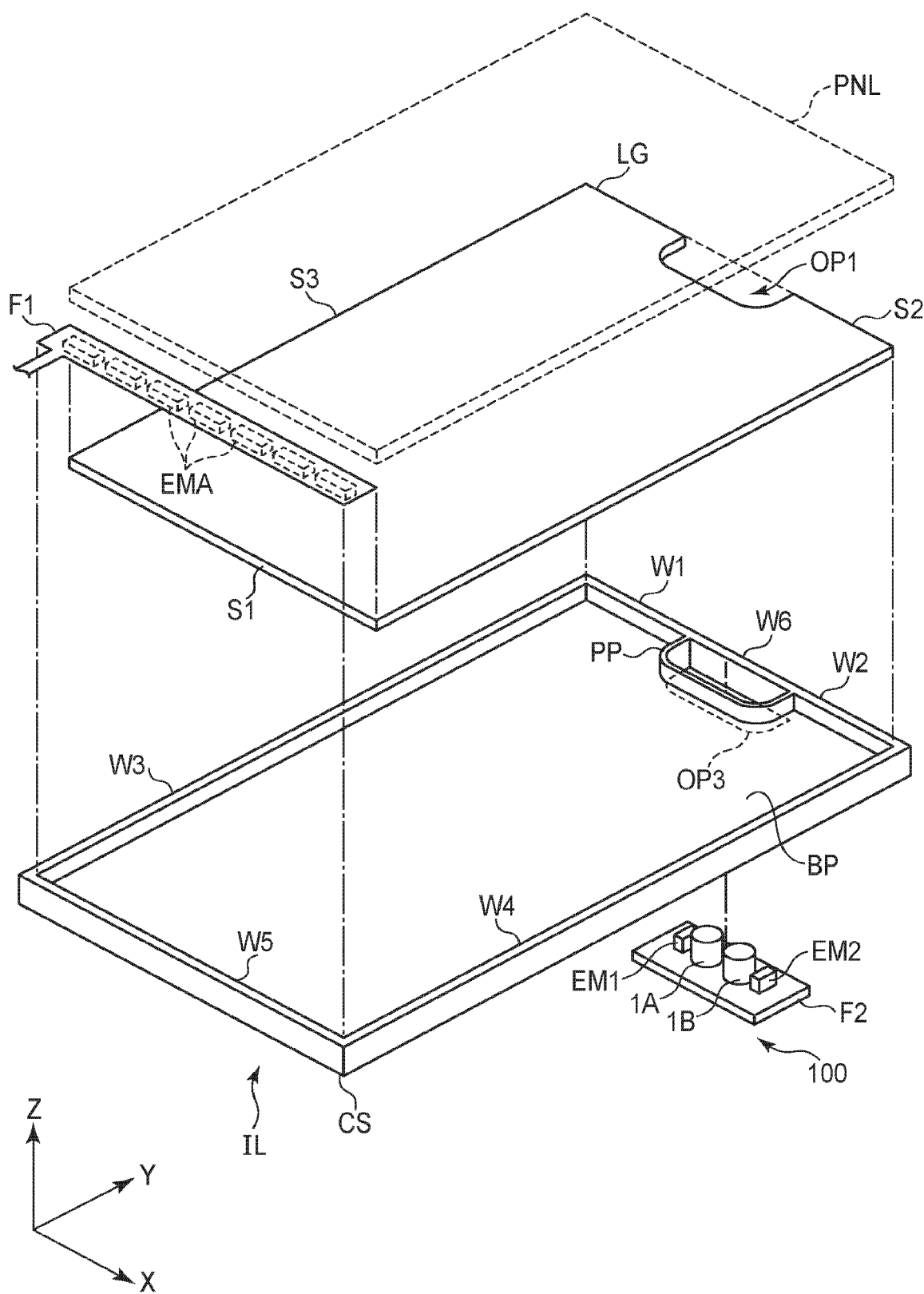
F I G. 8

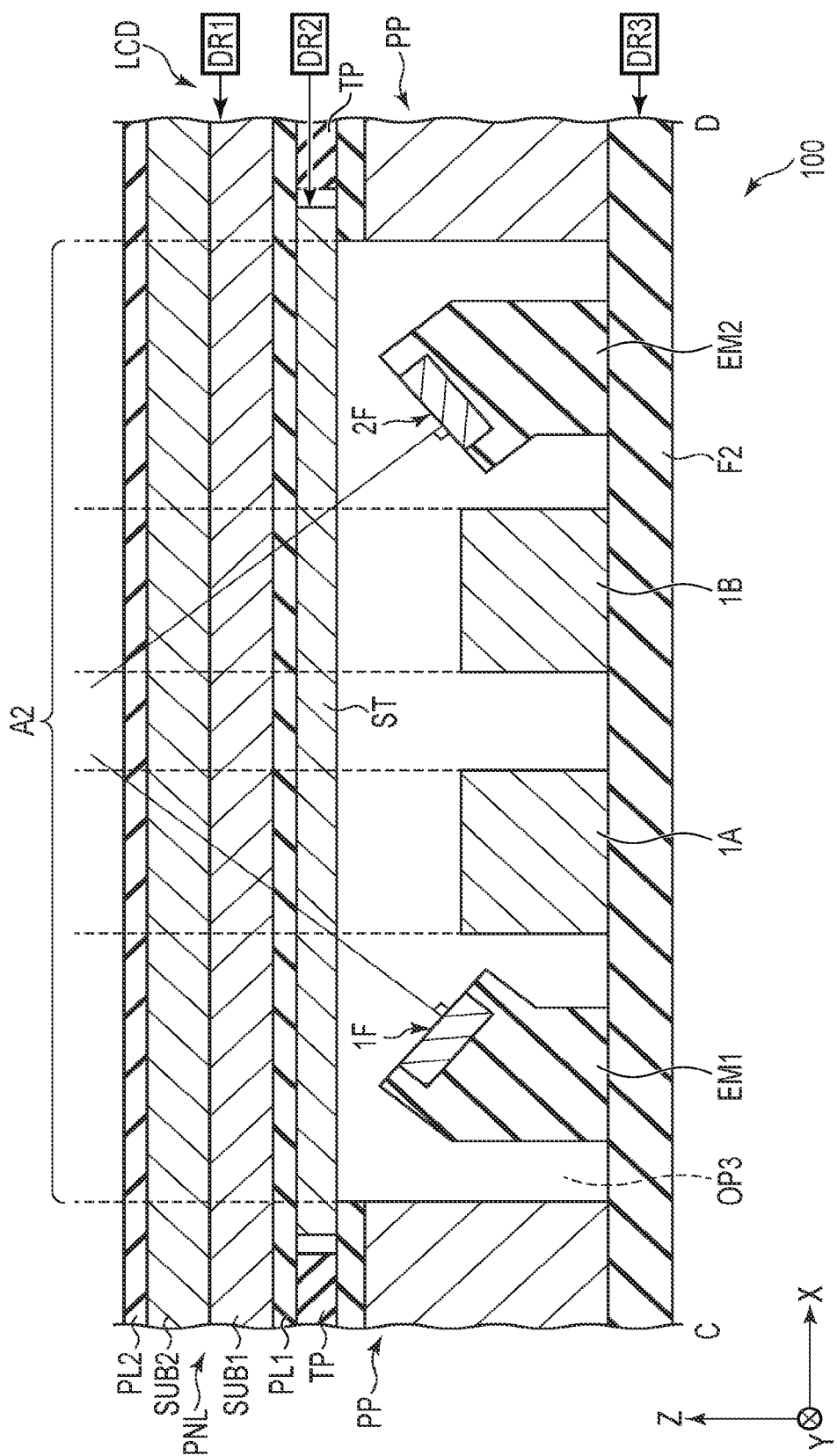
F I G. 10

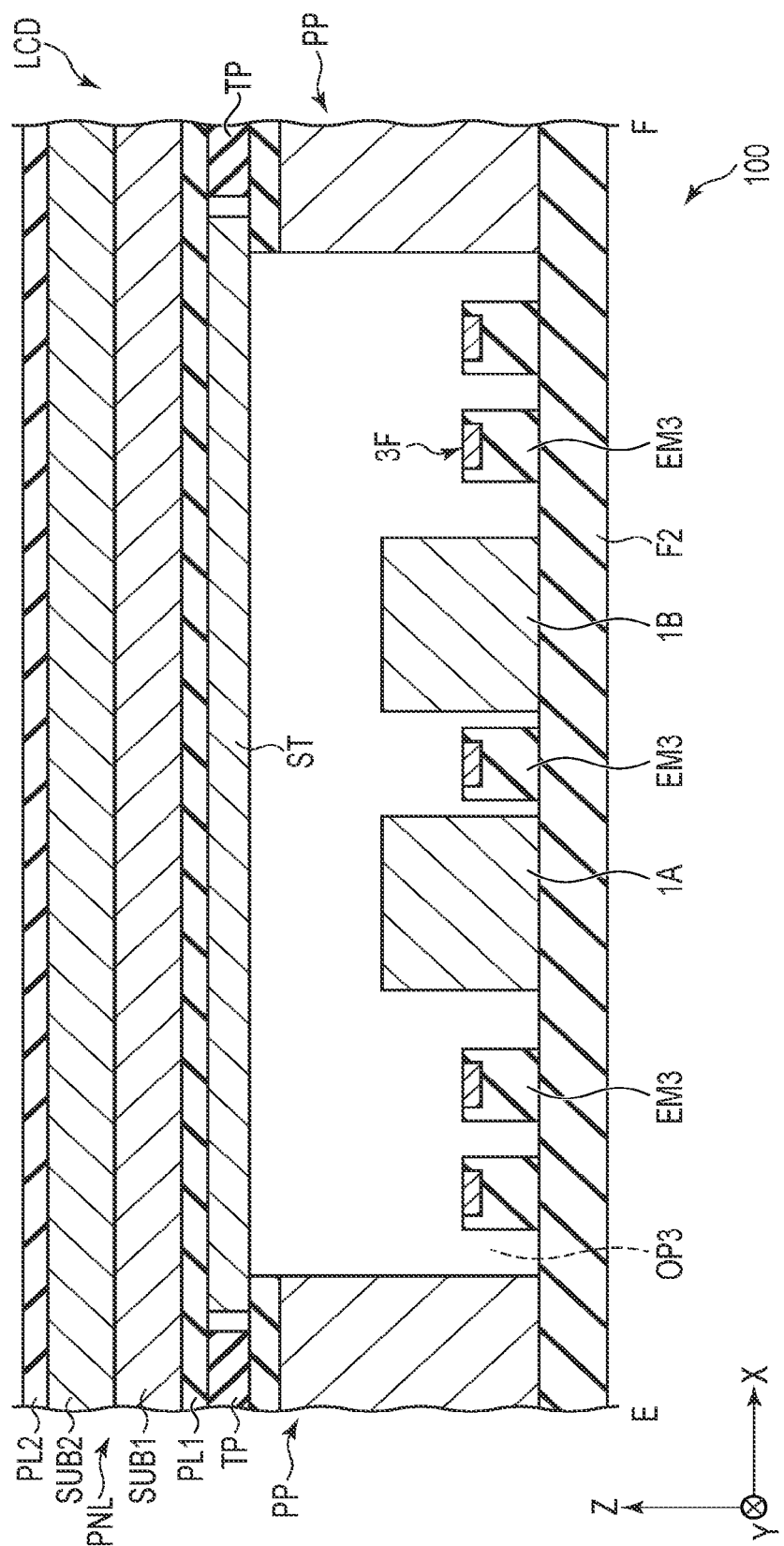
F I G. 12

ELECTRONIC DEVICE

CROSS-REFERENCE TO RELATED APPLICATIONS

This application is a Continuation Application of PCT Application No. PCT/JP2019/028723, filed Jul. 22, 2019 and based upon and claiming the benefit of priority from Japanese Patent Application No. 2018-161584, filed Aug. 30, 2018, the entire contents of all of which are incorporated herein by reference.

FIELD

Embodiments described herein relate generally to an electronic device.

BACKGROUND

Recently, electronic devices such as smartphones and the like, which comprise a display and a camera on the same surface side are widely put to practical use. In such electronic devices, the camera and the like are provided in an outer side of the display portion, and there is an increasing demand for reducing the width of the outer frame of the display portion while securing the space for installing the camera and the like. Further, in the illumination unit (backlight unit) which illuminates such a display portion, there is a demand of uniformizing the luminance of the illumination light.

BRIEF DESCRIPTION OF THE DRAWINGS

FIG. 1 is an exploded perspective view showing a configuration example of an electronic device 100 comprising an illumination unit IL, according to this embodiment.

FIG. 8 is an exploded perspective view showing still another configuration example of the electronic device 100.

FIG. 10 is a cross-sectional view of the electronic device 100 taken along line C-D shown in FIG. 9.

FIG. 12 is a cross-sectional view of the electronic device 100 taken along line E-F shown in FIG. 11.

DETAILED DESCRIPTION

Figure 2:
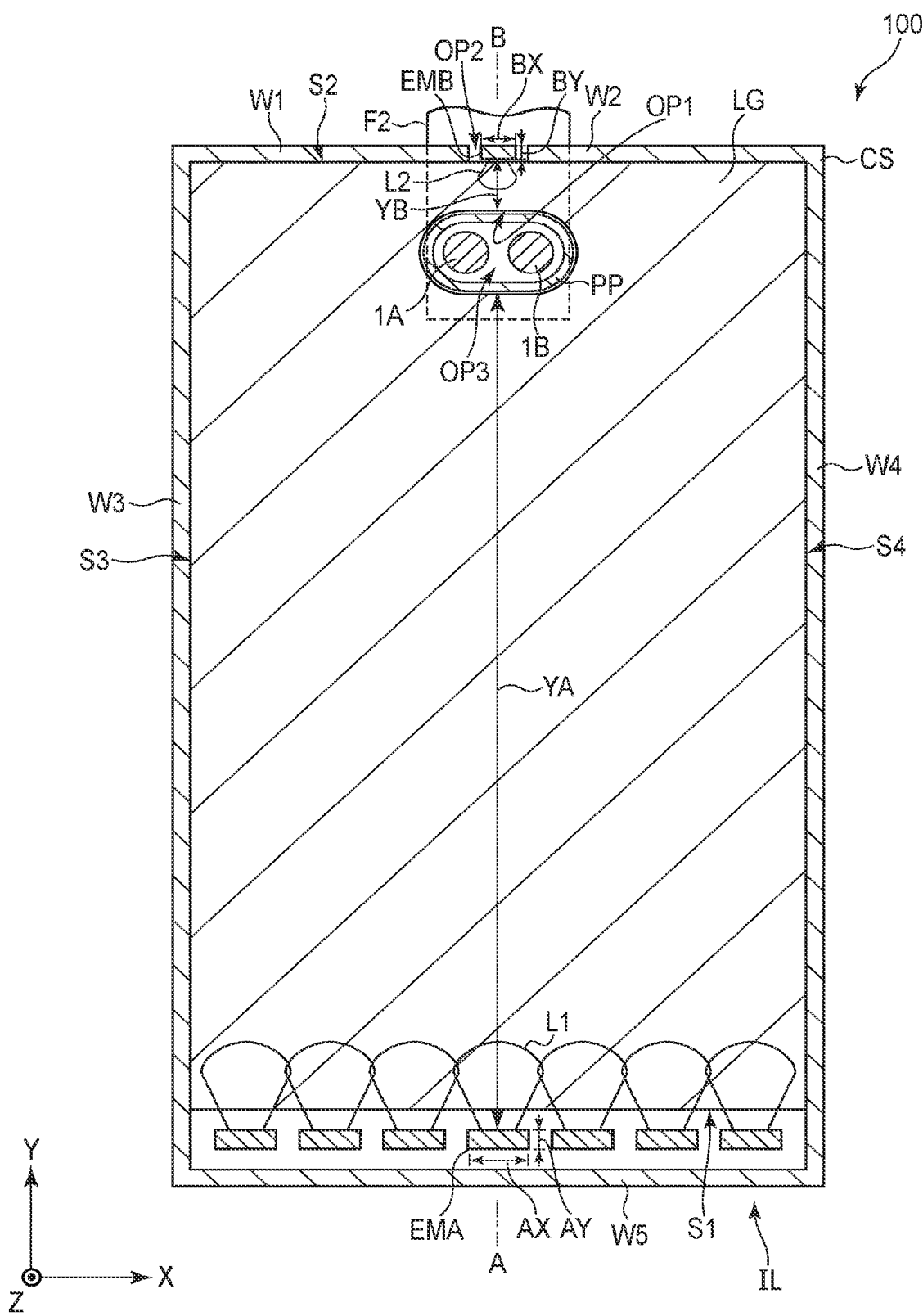
FIG. 2 is a plan view of the electronic device 100 shown in FIG. 1.

In general, according to one embodiment, an electronic device comprises a liquid crystal panel and an illumination unit which illuminates the liquid crystal panel. The illumination unit comprises a light guide comprising a first side surface, a main surface opposing the liquid crystal panel and an opening made by a notch or a through hole, a first light source opposing to the first side surface, and a second light source provided closer to the opening than to the first light source.

According to such configuration, an electronic device in which an illumination unit which can relieve nonuniformity of the luminance of illumination light is incorporated, can be provided.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

FIG. 1 is an exploded perspective view showing one configuration example of an electronic device 100 comprising an illumination unit IL, according to this embodiment. For example, a first direction X, a second direction Y and a third direction Z are orthogonal to each other, but may intersect at an angle other than ninety degrees.

The illumination unit IL comprises a light guide LG, light sources EMA, a light source EMB and a case CS. The illumination unit IL further comprises a plurality of optical sheets OS and a reflective sheet RS, but the illustration thereof is omitted. The illumination unit IL illuminates the liquid crystal panel PNL illustrated simply by, for example, a dotted line in FIG. 1.

The light guide LG is formed into a flat plate parallel to an X-Y plane defined by the first direction X and the second direction Y. The light guide LG comprises side surfaces S1 to S4, a main surface MS and an opening OP1. The side surface S2 is located on an opposite side to the side surface S1, and the side surfaces S1 and S2 each extend along the first direction X. The side surface S4 is located on an opposite side to the side surface S3 and the side surfaces S3 and S4 each extend along the second direction Y. The main surface MS is parallel to the X-Y plane. For example, the side surfaces S1 and S2 are parallel to an X-Z plane defined by the first direction X and the third direction Z. Further, the side surfaces S3 and S4 are parallel to a Y-Z plane defined by the second direction Y and the third direction Z. The opening OP1 is a through hole which penetrates the light guide LG along the third direction Z. The opening OP1 is located between the side surface S1 and the side surface S2 along the second direction Y, and is closer to the side surface S2 than to the side surface S1.

The light-emitting elements LS are arranged in the first direction X with intervals therebetween. Each of the light sources EMA is electrically connected to a wiring substrate F1.

The light source EMB is electrically connected to a wiring substrate F2. Note that FIG. 1 illustrates only one light source EMB, but a plurality of light sources EMB may be arranged with intervals therebetween.

The light sources EMA and EMB are, for example, light-emitting diodes (LEDs) and they emit white illumination light. Note that light-emitting diodes (LEDs) which emit light of different colors such as red, green, blue and the like may be arranged in lines to be used. In this case, the light emitting diodes (LEDs) of the respective colors emit light sequentially and the respective color displays are sequentially switched over, to achieve collar display, and thus the so-called field sequential system can be used.

The case CS contains the light guide LG and the light sources EMA. The case CS comprises side walls W1 to W5, a base plate BP, openings OP2 and OP3 and a projecting portion PP. The side walls W1 and W2 extend along the first direction X, and are arranged along the first direction X with intervals therebetween. In other words, between the side wall W1 and the side wall W2, the opening OP2 without a side wall is formed. The side walls W3 and W4 extend along the second direction Y and oppose each other. The side wall W5 extends along the first direction X, and opposes the side walls W1 and W2. The side wall W3 is connected to the side wall W1, the side wall W4 is connected to the side wall W2, and the side wall W5 is connected to the side walls W3 and W4. The opening OP3 is a through hole which penetrates the base plate BP along the third direction Z. The opening OP3 overlaps the opening OP1 along the third direction Z. The projecting portion PP projects from the base plate BP in the third direction Z and is provided to surround the opening OP3.

The electronic device 100 in which the illumination unit IL is incorporated comprises a camera 1A and a sensor 1B. In the example illustrated, the camera 1A and the sensor 1B are arranged along with an interval therebetween along the first direction X, are provided to overcome the opening OP3 along the third direction Z. At least one of the camera 1A and the sensor 1B is electrically connected to the wiring substrate F2 and the light source EMB which is common. Note that one of the camera 1A and the sensor 1B may be is electrically connected to the wiring substrate F2 together with the light source EMB, and the other of the camera 1A and the sensor 1B may be electrically connected to another wiring substrate separated from the light source EMB.

The camera 1A is a member which receives, for example, visible light, but it is not limited to this type. A type which detects infrared radiation will do as well. The sensor 1B is, for example, a proximity sensor which senses proximity of an object to be detected, but it is not limited to this type. Such a type will do as well, which comprises a projection element which projects infrared radiation towards an object to be detected and a detecting element which detects infrared radiation reflected from the object to be detected. When the camera 1A is a camera for the visible light and the sensor 1B is a proximity sensor, there may be separately provided a projection element which projects infrared radiation towards am object to be detected so as to form a plurality of dot-formed patterns, and a camera for infrared radiation, which detects dot patterns of the infrared reflected by the object to be detected.

FIG. 2 is a plan view of the electronic device 100 shown in FIG. 1. The light sources EMA are disposed between the side surface S1 of the light guide LG and the side wall W5 of the case CS and oppose the side surface S1. Note that illustration of the wiring substrate F1 shown in FIG. 1 is omitted here. The side walls W1 and W2 oppose the side surface S2, the side wall W3 opposes the side surface S3, and the side wall W4 opposes the side surface S4. The projecting portion PP of the case CS is located inside the opening OP1 of the light guide LG. The camera 1A and the sensor 1B are provided inside the opening OP3 of the case CS. The light source EMB is provided between the side walls W1 and W2. In other words, the light source EMB is located inside the opening OP2 of the case CS, and opposes the side surface S2 of the light guide LG.

The light source EMB is closer to the opening OP1 than to the light source EMA. That is, a distance YB between the light source EMB and the opening OP1 along the second direction Y is less than a distance YA between the light source EMA and the opening OP1 along the second direction Y.

The light sources EMA have a length AY along the first direction X and a length AX along the second direction Y. The light source EMB has a length BX along the first direction X and a length BY along the second direction Y. The length BX is less than the length AX, and the length BY is less than the length AY. That is, the light source EMB is smaller than the light sources EMA.

The opening OP3 is located inside the opening OP1. In the example illustrated, the openings OP1 and OP3 are both elliptical in plan view, but they may be of some other shape such as circular or polygonal.

Illumination light beams L1 emitted by the light sources EMA enter the side surface S1, and advance from the side surface S1 towards the side surface S2 inside of the light guide LG in the second direction Y. Thus, the illumination light beams L1 are propagate to a region between the side surface S1 and the side surface S2 and a region between the side surface S1 and the opening OP1. However, the illumination light beams L1 are not easily propagated to a region between the opening OP1 and the side surface S2.

An illumination light beam L2 emitted by the light source EMB enters the side surface S2, and advances towards the opening OP1. In other words, the illumination light L2 is propagated to the region between the opening OP1 and the side surface S2. Therefore, according to the present embodiment, it is possible to reduce the nonuniformity of the luminance of the illumination light in the illumination unit IL, which occurs due to the opening OP1 formed in the light guide LG.

Further, the light sources EMB are smaller in size than the light sources EMA and are placed in the opening OP2 between the side walls W1 and W2 of the case CS. With this structure, expansion of the width of the frame portion, which is caused by providing the light source EMB can be avoided.

Furthermore, since the camera 1A, the sensor 1B and the light source EMB are connected to the same wiring substrate F2, the number of connectors can be reduced, thereby making it possible to reduce the space where the wiring substrate is to be provided. Moreover, the number of parts can be reduced, thereby making it possible to reduce the production cost and simplify the manufacturing process.

In this embodiment, the light sources EMA correspond to the first light sources, and the light source EMB corresponds to the second light source, and the side surface S1 corresponds to the first side surface, and the side surface S2 corresponds to the second side surface.

Figure 3:
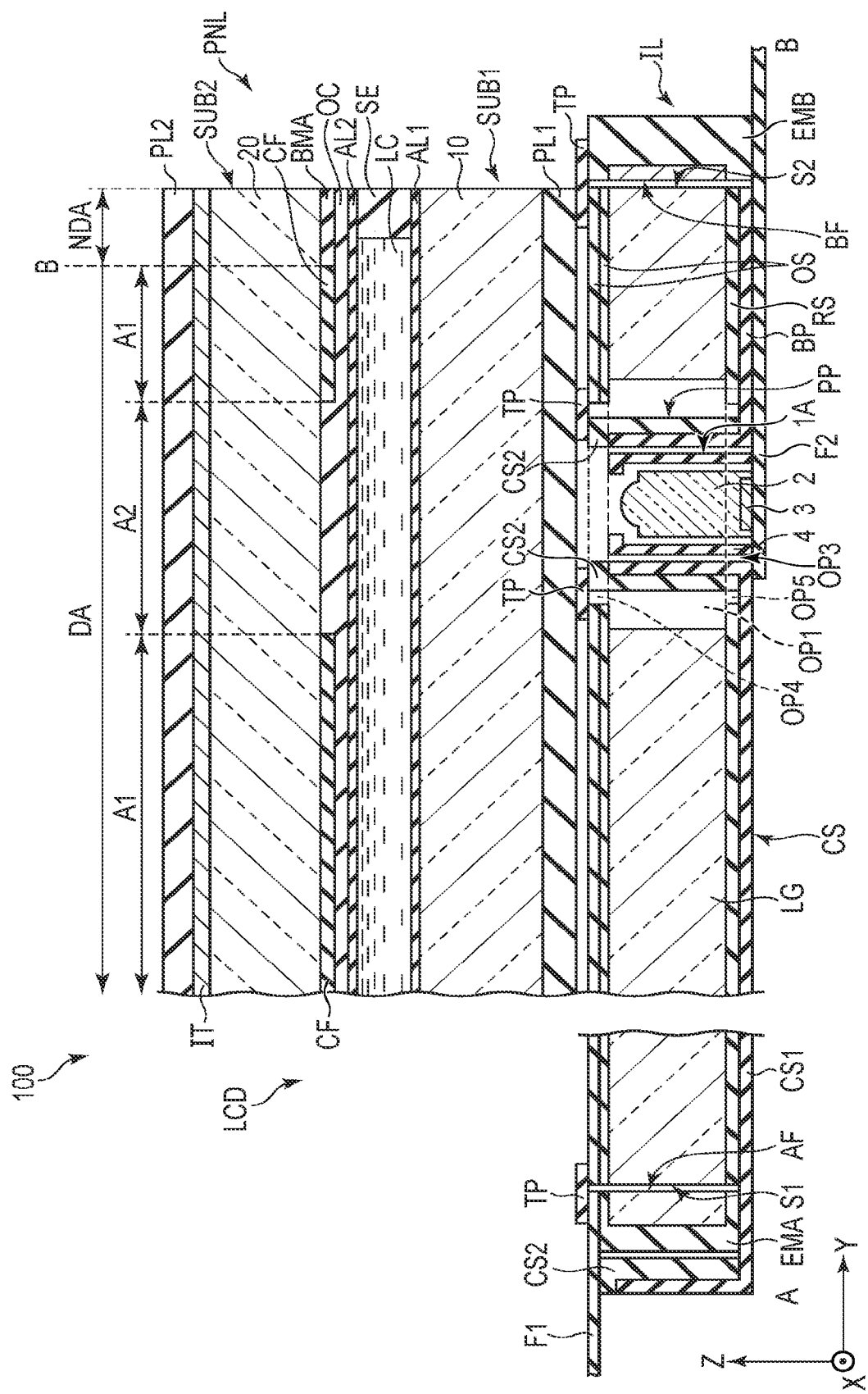
FIG. 3 is a cross-sectional view of the electronic device 100 taken along line A-B shown in FIG. 2.

FIG. 3 is a cross-sectional view of the electronic device 100 taken along line A-B shown in FIG. 2. Here, a cross section of the electronic device 100 along the second direction Y is shown, which includes the liquid crystal panel PNL, the camera 1A, the light sources EMA and EMB and the like. The electronic device 100 further includes, in addition to the camera 1A and the sensor 1B and the like, a first polarizer PL1, a liquid crystal panel PNL, a second polarizer PL2, optical sheets OS and a reflective sheet RS.

The reflective sheet RS, the light guide LG and the optical sheets OS are disposed in this order along the third direction Z, and are contained in the case CS. The case CS comprises a metal-made case CS1 and a resin-made case CS2. The optical sheets OS are, for example, prism sheets or diffusion sheets. Each of the optical sheets OS comprising an opening portion OP4 overlapping the opening OP1. The reflective sheet RS comprises an opening OP5 overlapping the opening OP1. The projecting portion PP of the case CS is located inside of the openings OP1, OP4 and OP5.

The gap between the optical sheet OS and the projecting portion PP is shielded by a light-shielding tape TP. With this structure, even if the illumination light advancing in the light guide LG is scattered in the vicinity of the projecting portion PP, leaking of the scattered light can be avoided.

Further, it is also possible to inhibit a foreign matter from entering the gap between the optical sheet OS and the projecting portion PP.

Similarly, the gap between the wiring substrate F1 and the optical sheet OS and the gap between the optical sheet OS and the light source EMB are also shield by the light-shielding tape TP. The light sources EMA each comprise a light-emitting surface AF opposing the side surface S1. The light source EMB comprises a light-emitting surface BF opposing the side surface S2.

The first polarizer PL1, the liquid crystal panel PNL and the second polarizer PL2 are disposed in this order along the third direction Z, and constitute a liquid crystal element LCD provided with an optical switch function for the light advancing along the third direction Z. The light-shielding tape TP is, for example, a double-faced adhesive tape which adheres the first polarizer PL1 and the case CS together, or the first polarizer PL1 and the optical sheet OS together.

The liquid crystal panel PNL may take any one of the configurations corresponding to a display mode which uses a display mode using a lateral electric field along a main surface of the substrate, a display mode using a longitudinal electric field along a normal of a main surface of the substrate, a display mode using an inclined electric field inclined to a direction slant to the main surface of the substrate, and a display mode using a combination of the lateral electric field, the longitudinal electric field and the inclined electric field. Here, the main surface of the substrate is a surface parallel to the X-Y plane.

The liquid crystal panel PNL comprises a display area DA which displays images and a non-display area NDA surrounding the display area DA. The liquid crystal panel PNL comprises a first substrate SUB1, a second substrate SUB2, a liquid crystal layer LC and a sealant SE. The sealant SE is located in the non-display area NDA, adheres the first substrate SUB1 and the second substrate SUB2 to each other, and seals the liquid crystal layer LC.

The main portions of the first substrate SUB1 and the second substrate SUB2 will be described as follows. The first substrate SUB1 comprises a first insulating substrate 10 and an alignment film AL1. The second substrate SUB2 comprises a second insulating substrate 20, a color filter layer CF, a light-shielding layer BMA, a transparent layer OC and an alignment film AL2.

The first insulating substrate 10 and the second insulating substrate 20 are transparent substrates such as glass substrates or flexible resin substrates and the like. The alignment films AL1 and AL2 are in contact with the liquid crystal layer LC.

The color filter layer CF, the light-shielding layer BMA and the transparent layer OC are located between the second insulating substrate 20 and the liquid crystal layer LC. In the example illustrated, the color filter CF is provided on the second substrate SUB2, but it may be provided on the first substrate SUB1.

The light-shielding layer BMA is located in the non-display area NDA. A border B between the display area DA and the non-display area NDA is defined by, for example, an inner end (an end portion on a display area DA side) of the light-shielding layer BMA. The sealant SE is provided in a position overlapping the light-shielding layer BMA.

Details of the color filter layer CF will be omitted here, but the color filter layer CF comprises, for example, a red color filter disposed in a red pixel, a green color filter disposed in a green pixel and a blue color filter disposed in a blue pixel. Further, the color filter layer CF may comprise a transparent resin layer disposed in a white pixel. The transparent layer OC covers the color filter layer CF and the light-shielding layer BMA. The transparent layer OC is, for example, a transparent organic insulating film.

The display area DA includes an area A1 on which the color filter layer CF is disposed and an area A2 on which the color filter layer CF is not disposed. The transparent layer OC is disposed over the area A1 and the area A2, and is in contact with the color filter layer CF in the area A1 and with the second insulating substrate 20 in the area A2. The alignment film AL1 and the alignment film AL2 are provided over the area A1 and the area A2.

The camera 1A is provided to overlap the opening OP3 of the case CS and is located on an inner side surrounded by the projecting portion PP. Similarly, the sensor 1B shown in FIG. 2 is provided to overlap the opening OP3. The camera 1A and the sensor 1B overlap the liquid crystal panel PNL, the first polarizer PL1 and the second polarizer PL2 along the third direction Z. Note that a part or all of the camera 1A and the sensor 1B overlap the display area DA of the liquid crystal panel PNL along the third direction Z. In other words, in the electronic device 100 comprising the liquid crystal panel PNL and the camera 1A, it suffices if the camera 1A is provided in the back of the liquid crystal panel PNL as viewed from the user of the electronic device 100.

When focusing on the positions of the camera 1A and the display area DA with relation to each other, thus illustrated, the camera 1A overlaps the area A2. In other words, the color filter layer CF do not overlap the camera 1A. Further, as in the case of the camera 1A, the sensor 1B also overlaps the area A2 and does not overlap the color filter layer CF.

For example, the camera 1A comprises, for example, an optical system 2 including at least one lens, an image sensor (imaging device) 3 and a case 4. The case 4 contains the optical system 2 and the image sensor 3. The optical system 2 is located between the liquid crystal panel PNL and the image sensor 3. The image sensor 3 receives light through the liquid crystal panel PNL, the first polarizer PL1 and the second polarizer PL2. For example, the camera 1A receives visible light (for example, light in a range of 400 nm to 700 nm) transmitted through the display area DA, the first polarizer PL1 and the second polarizer PL2. In the case where an absorption axis of the first polarizer PL1 and an absorption axis of the second polarizer PL2 are normal to each other, the transmittance of the liquid crystal element LCD is minimized when the retardation of the liquid crystal layer LC is equivalent to substantially 0 or $\lambda$ where $\lambda$ represents the wavelength of light transmitted through the liquid crystal layer LC of the liquid crystal element LCD. Therefore, to photograph with the camera 1A, the retardation of the liquid crystal layer LC is set greatly than zero but less than $\lambda$. When retardation is about $\lambda/2$, the transmittance of the liquid crystal element LCD is at maximum.

The first polarizer PL1 is adhered to the first insulating substrate 10. The second polarizer PL2 is adhered to the second insulating substrate 20. The first polarizer PL1 and the second polarizer PL2 are disposed over the areas A1 and A2. Note that the first polarizer PL1 and the second polarizer PL2 may comprise a retardation film, a scattering layer, an antireflection layer and the like as needed.

As shown, in order to prevent the liquid crystal layer LC from being affected by electric fields or the like from outside, a transparent conductive film IT is provided between the second polarizer PL2 and the second insulating substrate 20 in some cases. The transparent conductive film IT is formed from a transparent oxide conductor such as of indium-tin-oxide (ITO), indium-zinc-oxide (IZO) or the like. When the transparent conductive film IT causes degradation of the infrared transmittance, the reduction of the transmittance of the visible light can be inhibited by providing a region where the transparent conductive film IT is not formed, in the area A2 overlapping the sensor 1B. The region where the transparent conductive film IT is not formed can be expanded wider than the area A2. In the location overlapping the camera 1A for visible light, where low transmittance of infrared does not create a problem, a transparent conductive film IT may be formed. When a conductive resin having a transmittance to infrared higher than that of an oxide conductor is used as the transparent conductive film IT, the transparent conductive film IT can be provided in the regions overlapping the camera 1A and the sensor 1B.

Further, for example, the first polarizer PL1 or the second polarizer PL2 can comprise a super-birefringent film. The super birefringent film is known to be able to unpolarized transmitted light (into natural light) when linearly polarized light enters, and therefore it can photograph without a sense of uncomfortableness even if the object of the photography includes a matter emitting polarized light. For example, in the case where the liquid crystal display device and the like enter the object to be photographed by the camera 1A, a sense of uncomfortableness may be undesirably created when photographing. This is because linearly polarized light is emitted from the liquid crystal display device, and therefore the brightness of the liquid crystal display device in the object to be photographed, which is made incident on the camera 1A, varies due to the angles of the first polarizer PL1 and the second polarizer PL2 and the polarizing plate of the liquid crystal display device, which is a part of the object to be photographed, in relation to each other. However, with the super-birefringent film provided in the first polarizer PL1 and the second polarizer PL2, the variation in brightness, which may cause a sense of uncomfortableness, can be suppressed.

A preferable example of the film exhibiting a super-birefringence is Cosmo Shine (registered trademark) produced by Toyobo Co., Ltd. Here, the super birefringence is a property in which the retardation in an in-plane the direction to light in the visible region, for example, light of 500 nm is 800 nm or higher.

Further, the first polarizer PL1 may comprise a reflective layer which reflects a polarized component of the illumination light from the illumination unit IL, which is parallel to the absorption axis of the first polarizer PL1, towards the illumination unit IL. In the case where the first polarizer PL1 with such configuration is applied, a part of the infrared ray projected by the infrared projection element of the sensor 1B is reflected by the reflective layer, thereby lowering the use efficiency of the light. Further, the reflected light reflected by the reflective layer may enter the sensor 1B, causing an adverse effect. Therefore, in the region overlapping the camera 1A and the sensor 1B, it is preferable to remove the reflective layer from the first polarizer PL1.

Note that the light emitted from the infrared projection element of the sensor 1B and reflected by the reflective layer is reused, and therefore a reflective layer which reflects reaching light may be provided in or around the sensor 1B.

Figure 4:
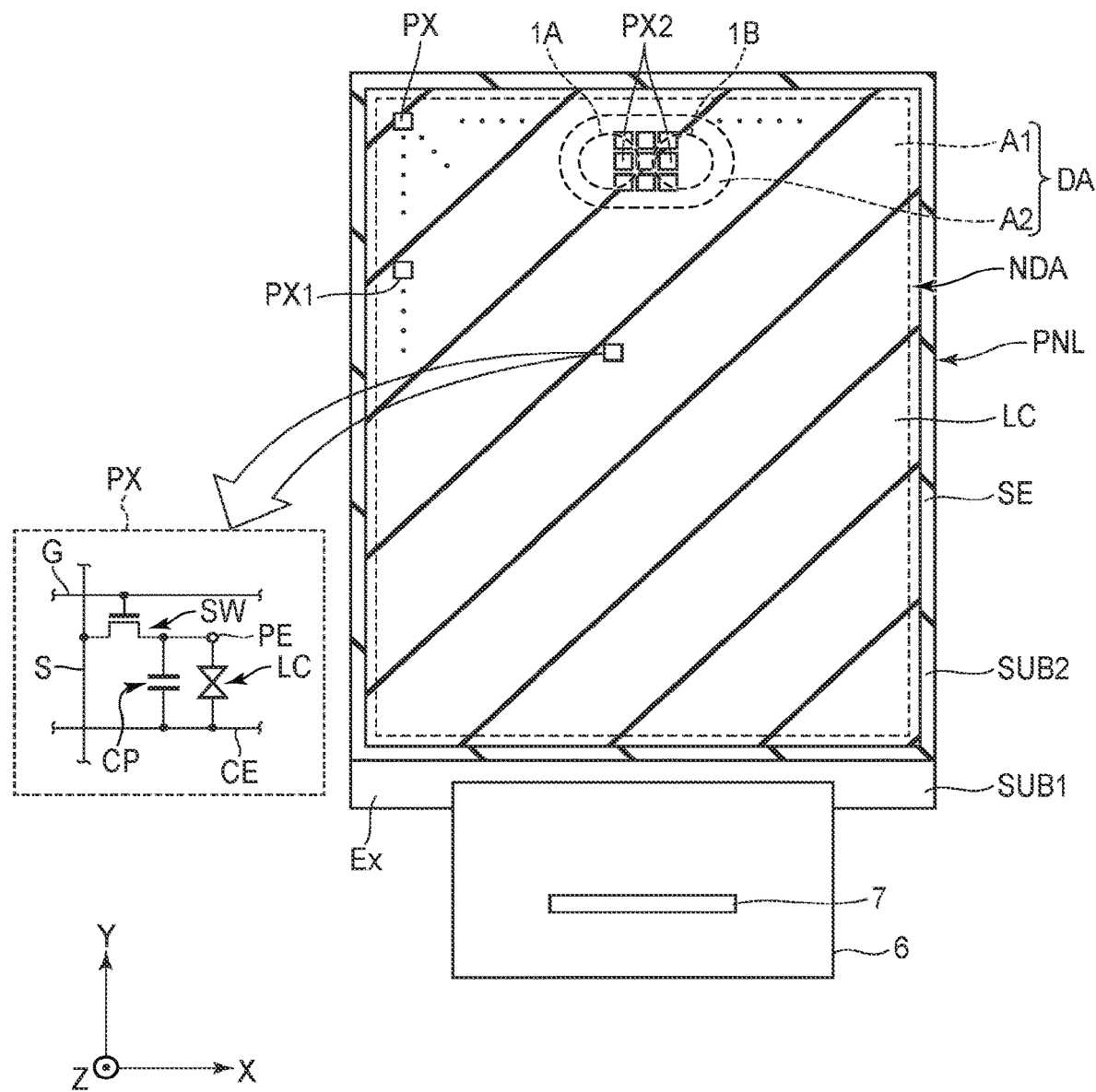
FIG. 4 is a plan view showing a configuration example of a liquid crystal panel PNL shown in FIG. 3.

FIG. 4 is a plan view showing a configuration example of the liquid crystal panel PNL shown in FIG. 3. In FIG. 3, the liquid crystal layer LC and the sealant SE are indicated by different hatch lines. The outlines of the camera 1A and the sensor 1B are indicated by dotted lines. The display area DA is a substantially rectangular area which does not include a notch, but the four corners may be rounded, or it may be polygonal other than rectangular or circular. The display area DA is located on an inner side surrounded by the sealant SE.

The liquid crystal panel PNL comprises a plurality of pixels PX arrayed in a matrix along the first direction X and the second direction Y, in the display area DA. The pixels PX in the display area DA have the same circuit structure. As expanded in FIG. 3, each of the pixels PX comprises a switching element SW, a pixel electrode PE, a common electrode CE, a liquid crystal layer LC and the like. The switching element SW is formed from, for example, a thin-film transistor (TFT) and is electrically connected to a scanning line G and a signal line S. To the scanning lines G, a control signal to control the switching element SW is supplied. To the signal line S, a video signal is supplied as a signal different from the control signal. The pixel electrode PE is electrically connected to the switching element SW. Each of the pixel electrodes PE opposes the common electrode CE and drives the liquid crystal layer LC by the electric field produced between the pixel electrode PE and the common electrode CE. A capacitance CP is formed between, for example, an electrode at the same potential as that of the common electrode CE and an electrode at the same potential as that of the respective pixel electrode PE.

The wiring substrate 6 is connected to electrically connected to an extending portion Ex of the first substrate SUB1. An IC chip 7 is electrically connected to the wiring substrate 6. Note that the IC chip 7 may be electrically connected to the extending portion Ex. The IC chip 7 incorporates therein, for example, a display driver DD which outputs a signal necessary for image display. The wiring substrate 6 is a flexible printed circuit board which is bendable.

In the display area DA, a pixel PX1 which does not overlap the camera 1A or the sensor 1B is equivalent to a pixel in the area A1 shown in FIG. 3, and it comprises a color filter layer CF. In other words, the pixel PX1 can display one of red, green and blue colors. When the pixel PX1 is a white pixel, the pixel PX1 can display one of white (or transparency), gray and black. The pixel PX1 is disposed over an entire region overlapping the light guide LG in the display area DA. Further, the pixel PX1 may be placed in a region of the area A2, which does not overlap the camera 1A or the like.

In the display area DA, pixels PX2 overlapping the camera 1A and the sensor 1B are equivalent to pixels in the area A2 shown in FIG. 3, and they do not comprise a color filter layer CF. In other words, the pixels PX2 are monochromatic display pixels and can display white (or transparency), gray or black. Note that, in FIG. 4, the outlines of the camera 1A and the sensor 1B are indicated by dotted lines, and the pixels PX2 overlapping the camera 1A and the sensor 1B are shown. Ideally, the pixels PX2 overlap the optical system 2 including lenses such as the camera 1A and the like in plan view, but they may overlap the case 4 such as of the camera 1A or the like.

Further, the camera 1A and the sensor 1B overlap the liquid crystal panel PNL. Further, the camera 1A and sensor 1B overlap the display area DA of the liquid crystal panel PNL. Thus, the display area DA can be expanded. Moreover, it is not necessary to provide a space to install the camera 1A and the like in the non-display area NDA, the width of the frame of the non-display area NDA can be reduced.

Figure 5:
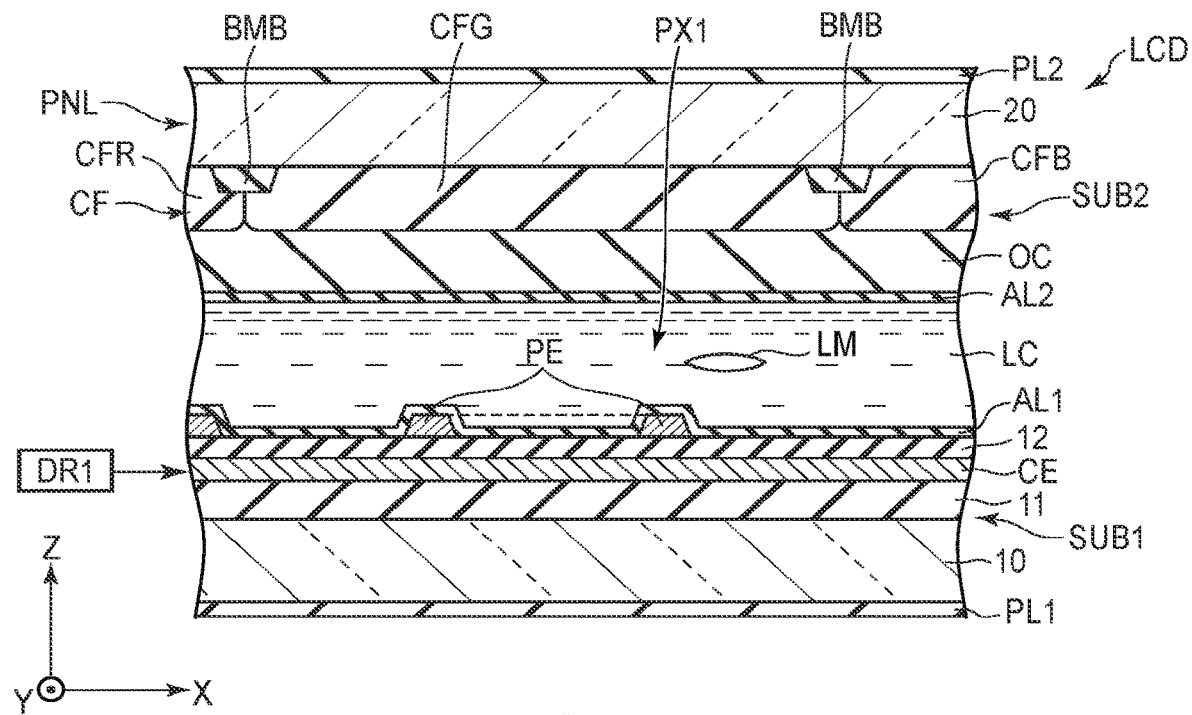
FIG. 5 is a cross-sectional view of a liquid crystal element LCD containing a pixel PX1 shown in FIG. 4.

FIG. 5 is a cross-sectional view of the liquid crystal element LCD including the pixel PX1 shown in FIG. 4. Herein, a liquid crystal element LCD comprising a liquid crystal panel PNL provided for the display mode using a lateral electric field, between the first polarizer PL1 and the second polarizer PL2, will be described.

The first substrate SUB1 comprises insulating films 11 and 12, a common electrode CE and pixel electrodes PE between the first insulating substrate 10 and the alignment film AL1. Note that the scanning line, the signal line and the switching element shown in FIG. 4 are located, for example, between the first insulating substrate 10 and the common electrode CE. The common electrode CE is located on the insulating film 11 and is covered by the insulating film 12. The pixel electrode PE is located on the insulating film 12 and is covered by the alignment film AL. The pixel electrode PE opposes the common electrode CE via the insulating film 12. The common electrode CE and the pixel electrodes PE are formed from, for example, a transparent conductive material such as indium-tin-oxide (ITO) or indium-zinc-oxide (IZO). The pixel electrodes PE are linear electrodes, and the common electrode CE is a plate-like electrode provided commonly over a plurality of pixels PX1. Note that such a structure will do as well that the pixel electrodes PE may be formed from plate-like electrodes and a linear-shaped common electrode may be provided between the pixel electrodes PE and the liquid crystal layer LC. Although it will not be described in detail, the insulating film 11 includes an inorganic insulating film and an organic compound insulator. The insulating film 12 is, for example, an inorganic insulating film such as of silicon nitride or the like.

In the second substrate SUB2, the light-shielding layer BMB is formed to be integrated with the light-shielding layer BMA of the non-display area NDA shown in FIG. 2. The color filter CF includes a red color filter CFR, a green color filter CFG, and a blue color filter CFB. The green color filter CFG opposes the pixel electrodes PE. The red color filter CFR and the blue color filter CFB also oppose the other pixel electrodes PE, respectively.

A driving unit DR1 which drives the liquid crystal element LCD includes, for example, a scanning line drive circuit electrically connected to a scanning line G, and a signal line drive circuit electrically connected to a signal line S, shown in FIG. 4. The driving unit DR1 outputs a signal necessary for image display to each pixel PX of the display area DA, so as to control the transmittance of the liquid crystal element LCD. The transmittance of the liquid crystal element LCD is controlled according to the degree of the voltage applied to the liquid crystal layer LC.

For example, in the pixels PX1, during an OFF state in which voltage is not applied to the liquid crystal layer LC, liquid crystal molecules LM contained in the liquid crystal layer LC are initially aligned along a predetermined direction between the alignment films AL1 and AL2. In such an OFF state, the light guided from the light sources EMA shown in FIG. 1 to the pixels PX1 is absorbed by the first polarizer PL1 and the second polarizer PL2. Therefore, the liquid crystal element LCD displays black in the pixels PX1 of the OFF state.

On the other hand, during an ON state in which voltage is applied to the liquid crystal layer LC, the liquid crystal molecules LM are aligned by the electric field formed between the pixel electrode PE and the common electrode CE in a direction different from the initial alignment direction, and the alignment direction is controlled by the electric field. During such an ON state, part of the light guided by the pixels PX1 is transmitted through the first polarizer PL1 and the second polarizer PL2. Thus, the liquid crystal element LCD displays a color according to the respective color filter layer CF in the pixels PX1 of the ON state.

The example described above is equivalent to the so-called normally black mode, which displays black by the OFF state, but a normally white mode, which displays black by the ON state (displays white by the OFF state) may be applied.

Figure 6:
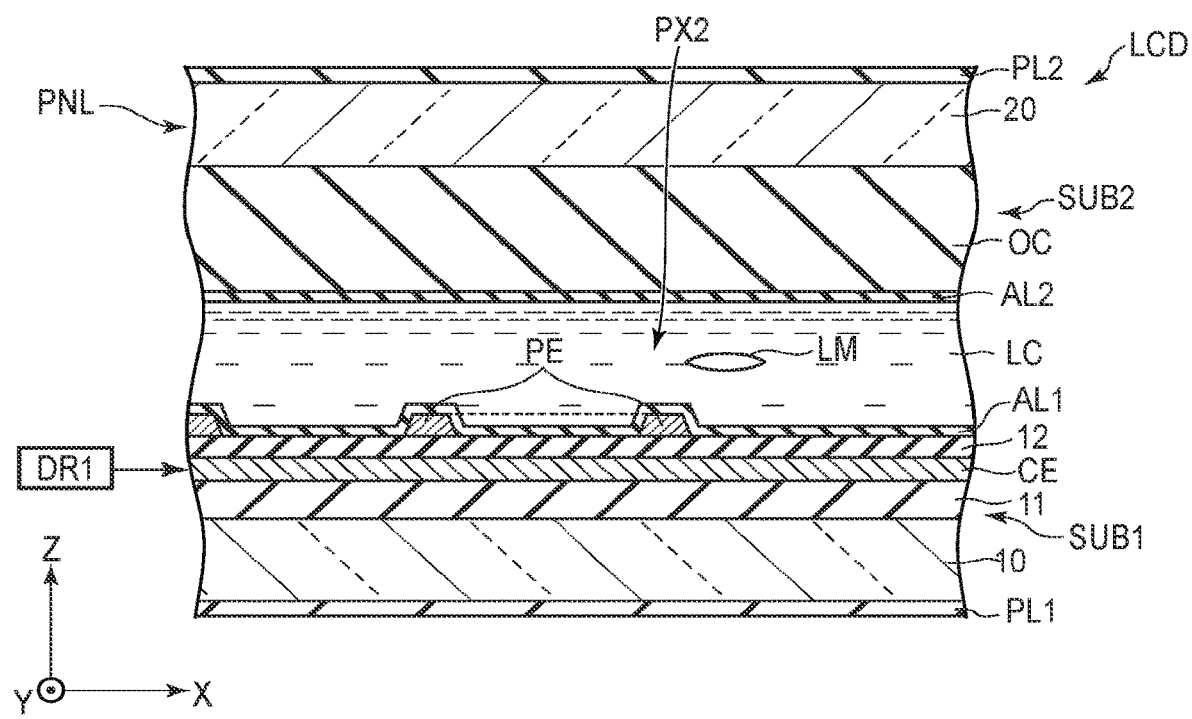
FIG. 6 is a cross-sectional view of a liquid crystal element LCD containing a pixel PX2 shown in FIG. 4.

FIG. 6 is a cross-sectional view of the liquid crystal element LCD including the pixel PX2 shown in FIG. 4. The pixels PX2 are different from the pixels PX1 shown in FIG. 5 in the respect that the second substrate SUB2 does not comprise a color filter layer CF or a light-shielding layer BMB. That is, the transparent layer OC is in contact with the second insulating substrate 20 directly above the pixel electrodes PE. Note that in order to adjust the thickness of the transparent layer OC, a transparent resin layer may be provided between the transparent layer OC and the second insulating substrate 20.

As in the case of the pixels PX1, the transmittance of the pixels PX2 of the liquid crystal element LCD is controlled by the driving unit DR1. That is, in the pixels PX2 of the off state where voltage is not applied to the liquid crystal layer LC, the liquid crystal element LCD exhibits the minimum transmittance and displays black as in the case of the pixels PX1.

On the other hand, in the ON state where voltage is applied to the liquid crystal layer LC, part of the light guided by the pixels PX2 is transmitted through the first polarizer PL1 and the second polarizer PL2. In the pixels PX2 of the ON state, the liquid crystal element LCD displays white or exhibits a transparent state when the transmittance is at maximum. Further, as described above, the liquid crystal element LCD can be controlled to so as to exhibit an intermediate transmittance between the minimum transmittance and the maximum transmittance and display gray. Note that common electrode CE is formed into a flat plate shape in FIG. 6, but the pixels PX2 may be of a configuration that an opening is provided in the common electrode CE. Further, in the case of a configuration that the pixel electrodes PE are provided on and insulating substrate side with respect to the common electrode CE, an opening may be provided in the pixel electrodes PE. Moreover, the pixel electrodes PE and the common electrode CE may be formed from linear electrodes. In this case, the linear pixel electrodes PE and the linear common electrode CE can be provided in the same layer. Further, the pixel electrodes PE and the common electrode CE can be provided in different layers via an insulator film. In the case where a liquid crystal lens is formed using the liquid crystal layer LC, the degree of freedom of the lens characteristics can increased to be higher when the lens is formed with the linear pixel electrodes PE and the linear common electrode CE than when the lens is formed with the plate-like electrodes and the linear electrodes.

Figure 7:
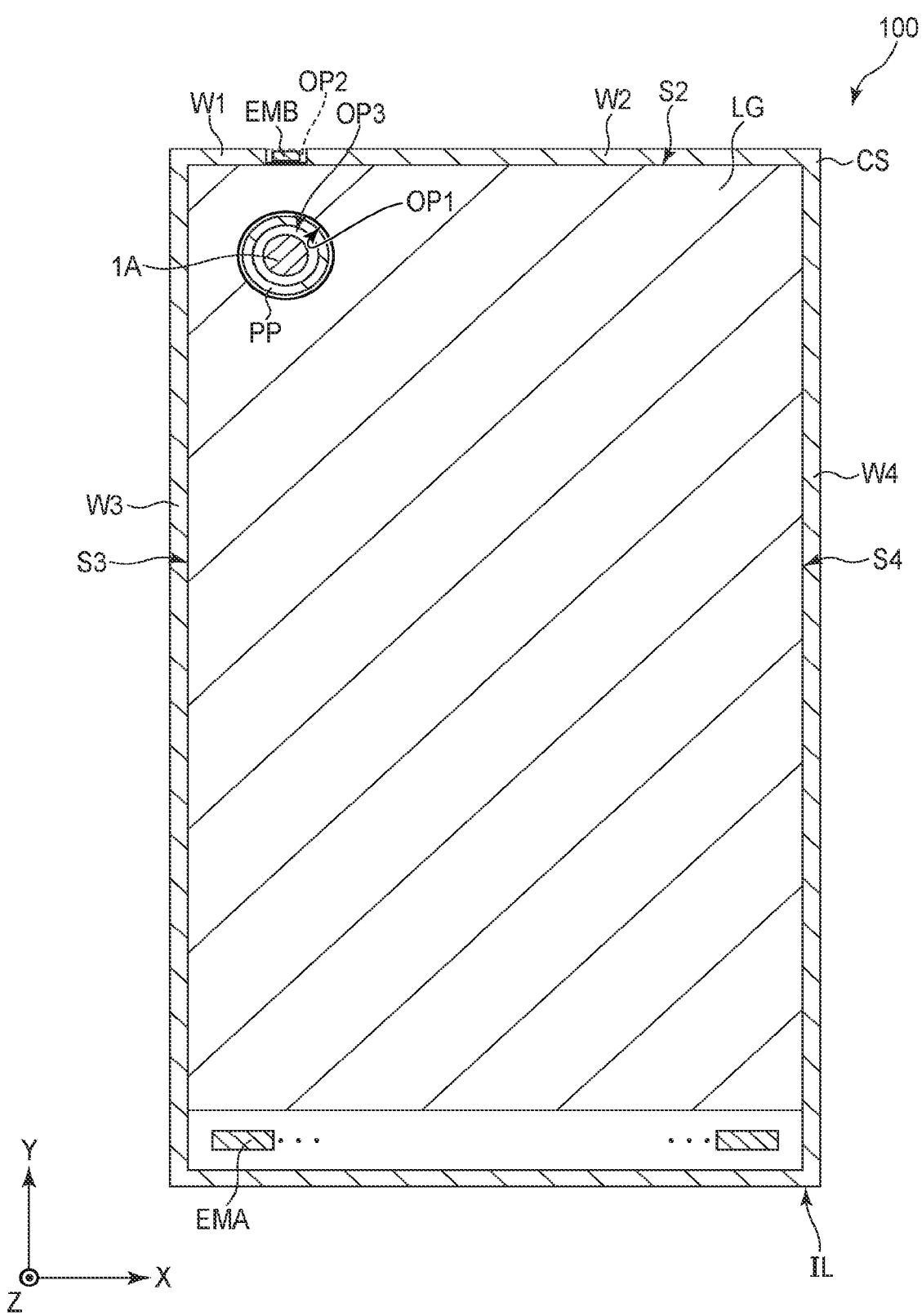
FIG. 7 is a plan view showing another configuration example of the electronic device 100.

FIG. 7 is a plan view showing another configuration example of the electronic device 100. The configuration example shown in FIG. 6 is different from that of FIG. 1 in the respect that the sensor 1B is omitted and the camera 1A is close to the side wall W3 or the side wall W4 of the case CS. In the example illustrated, the camera 1A is close to the side wall W3. The opening OP1 of the light guide LG is close to the side surface S3 between the side surfaces S3 and S4. The opening OP3 and the projecting portion PP of the case CS are close to the side wall W3 between the side walls W3 and W4. The camera 1A is located inside the projecting portion PP. Note that the openings OP1 and OP2 are formed into a circular shape, but the shape is not limited to this, and they may be of some other shape such as elliptic or the like. The light source EMB opposes the side surface S2 and is located between the side wall W1 and the side wall W2. The length of side wall W1 along the first direction X is less than the length of the side wall W2. The camera 1A and the light source EMB are arranged along the second direction Y with the projecting portion PP interposed therebetween.

With such a configuration example described above as well, advantageous effects similar to those of the configuration example provided above can be obtained.

FIG. 8 is an exploded perspective view showing another configuration example of the electronic device 100. The configuration example shown in FIG. 8 is different from that of FIG. 1 in the respect that the opening OP1 of the light guide LG is a recess portion or a notch recessed from the side surface S2 towards the side surface S1.

In the case CS, the opening OP3 overlaps the opening OP1 along the third direction Z. In the example illustrated, the opening OP3 is a through hole which penetrates the base plate BP. The projecting portion PP is provided to surround the opening OP3, and connected to the side walls W1 and W2. Further, in the example illustrated, a side wall W6 is provided to surround the opening OP3 together with the projecting portion PP. Note that the side wall W6 may be omitted, and in this case, the opening OP3 is formed as a recess portion or a notch similar to that of the opening OP1.

The light source EM1, the camera 1A, the sensor 1B and the light source EM2 are arranged along the first direction X with intervals therebetween so as to overlap the opening OP3 along the third direction Z. The light source EM1, the camera 1A, the sensor 1B and the light source EM2 are electrically connected to the wiring substrate F2. Note that the camera 1A and the sensor 1B may be electrically connected to different wiring substrates, respectively, the camera 1A and the light source EM1 may be connected to the same wiring substrate with the, and the sensor 1B and the light source EM2 may be connected to the same wiring substrate.

Note that liquid crystal panel PNL overlaps the light guide LG and also overlaps the camera 1A, the sensor 1B, the light sources EM1 and EM2 in the opening OP1.

In the configuration example shown in FIG. 8, the light sources EMA are equivalent to the first light source, and the light sources EM1 and EM2 are equivalent to the second light source.

Figure 9:
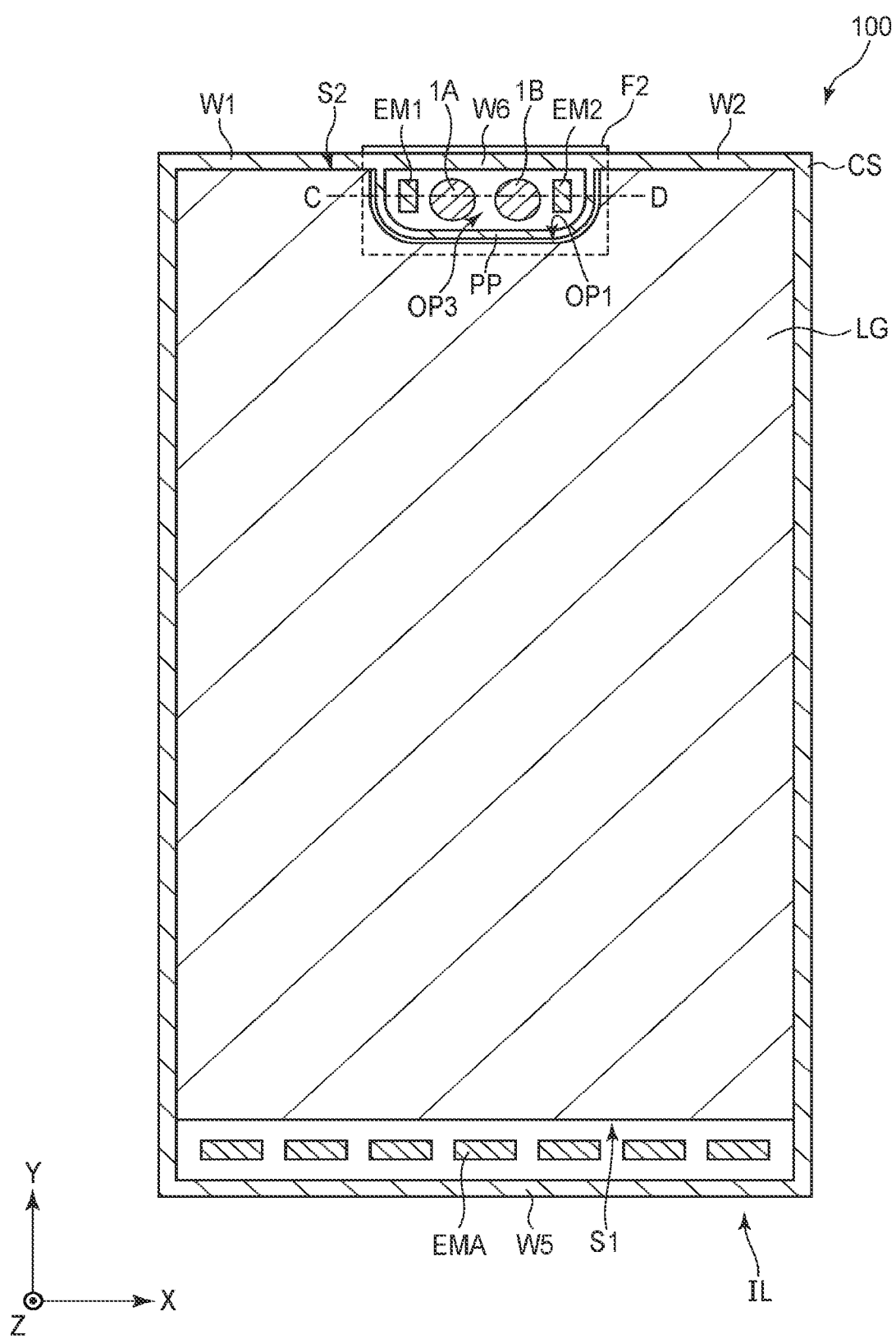
FIG. 9 is a plan view of the electronic device 100 shown in FIG. 8.

FIG. 9 is a plan view of the electronic device 100 shown in FIG. 8. The projecting portion PP and the opening OP3 of the case CS are located inside the opening OP1 of the light guide LG. The camera 1A, the sensor 1B, the light sources EM1 and EM2 are provided inside the opening OP3 of the case CS. The light sources EM1 and EM2 are closer to the opening OP1 as compared to the light source EMA. That is, in this configuration example, the light source EMA is provided between the side surface S1 and the side wall W5, and the light sources EM1 and EM2 are provided in the opening OP1. Further, the light sources EM1 and EM2 are smaller than the light source EMA.

Note that in the example illustrated, two light sources EM1 and EM2 are provided in the opening OP1, but more light sources may be provided in the opening OP1.

FIG. 10 is a cross-sectional view of the electronic device 100 taken along line C-D shown in FIG. 9. The electronic device 100 further comprises a scattering control element ST. The scattering control element ST is configured to be able to switch a transparent state and a scattering state. The scattering control element ST is located between the liquid crystal panel PNL and the light sources EM1 and EM2 and between the liquid crystal panel PNL and the camera 1A and sensor 1B. In the example illustrated, the scattering control element ST is fixed between the projecting portion PP of the case CS and the first polarizer PL1, but it may be fixed by being adhered to the first polarizer PL1. Further, the scattering control element ST may be placed to cover the opening OP3.

Here, one configuration example of the scattering control element ST will be described. The scattering control element ST is a liquid crystal panel comprising polymer dispersed liquid crystal in which liquid crystal molecules are dispersed in polymers. The polymers and the liquid crystal molecules each have optical anisotropy or refractive anisotropy. For example, the alignment direction of the polymers does not substantially change regardless of the presence or absence of an electric field. On the other hand, the alignment direction of the liquid crystal molecules changes in accordance with the electric field in a state in which a voltage higher than the threshold value is applied. In the state where the optical axes of the polymers and the liquid crystal molecules are parallel to each other, the light made incident on the scattering control element ST is transmitted without being substantially scattered (a transparent state). In the state where the optical axes of the polymers and the liquid crystal molecules cross each other, the light made incident on the scattering control element ST is scattered (a scattering state).

Such a scattering control element ST is controlled by a driving unit DR2. The driving unit DR2 controls the voltage applied to the scattering control element ST and switches over between the transparent state and the scattering state.

The camera 1A and the sensor 1B are located between the light-emitting devices EM1 and EM2. The light source EM1 comprises a light-emitting surface 1F opposing the liquid crystal panel PNL, and the light source EM2 comprises a light-emitting surface 2F opposing the liquid crystal panel PNL. The light-emitting surfaces 1F and 2F are inclined towards the camera 1A and the sensor 1B, respectively. More specifically, the normal of the light-emitting surface 1F is inclined so as to cross a region of the liquid crystal panel PNL, which is directly above the camera 1A. The normal of the light-emitting surface 2F is inclined so as to cross a region of the liquid crystal panel PNL, which is directly above the sensor 1B. The inclination of the light-emitting surfaces 1F and 2F can be implemented by, for example, containing the light-emitting devices are contained in the case in an inclined state. Or the optical system is provided on front surfaces of the light-emitting devices to refract light from the light-emitting devices.

The camera 1A, the sensor 1B, and the light-emitting devices EM1 and EM2 are controlled by a driving unit DR3.

Next, an example of controlling by the driving units DR1 to DR3 will be described.

When using at least one of the camera 1A and the sensor 1B, the driving unit DR1 is controlled so as to make at least the area A2 of the liquid crystal element LCD into the transparent state. Preferably, the retardation of the liquid crystal layer LC is set to about λ/2 and is controlled so as to make the transmittance of the liquid crystal element LCD to become maximum.

The driving unit DR2 controls so as to make the scattering control element ST into the transparent state.

The driving unit DR3 controls the light sources EM1 and EM2 to turn off the light. The driving unit DR3 controls the camera 1A to photograph through the liquid crystal element LCD. Or, the driving unit DR3 controls the sensor 1B to sense through the liquid crystal element LCD. By such controlling operations, the photographing by the camera 1A and the sensing by the sensor 1B are not affected by the illumination light from the light sources EM1 and EM2.

When the camera 1A and the sensor 1B are not used, images can be displayed in the area A2. That is, the driving unit DR3 controls the light sources EM1 and EM2 to turn on. Further, the driving unit DR2 control the scattering control element ST to create the scattering state. Thus, the illumination light emitted by the light sources EM1 and EM2 is scattered by the scattering control element ST in the scattering state.

As described with reference to FIG. 8 and the like, in the illumination unit IL in which the opening OP1 is provided in the light guide LG, the illumination light from the light sources EMA does not reach the inside of the opening OP1 and therefore the area A2 of the liquid crystal panel PNL, which overlaps the opening OP1 cannot be sufficiently illuminated. In this configuration example, the area A2 is illuminated by the illumination light from the light sources EM1 and EM2 placed directly thereunder. Thus, the nonuniformity of the luminance of the illumination light, which may be caused by providing the opening OP1 in the light guide LG can be reduced. Further, the driving unit DR1 controls the pixels PX2 of the area A2, and thus images can be displayed in the area A2.

Figure 11:
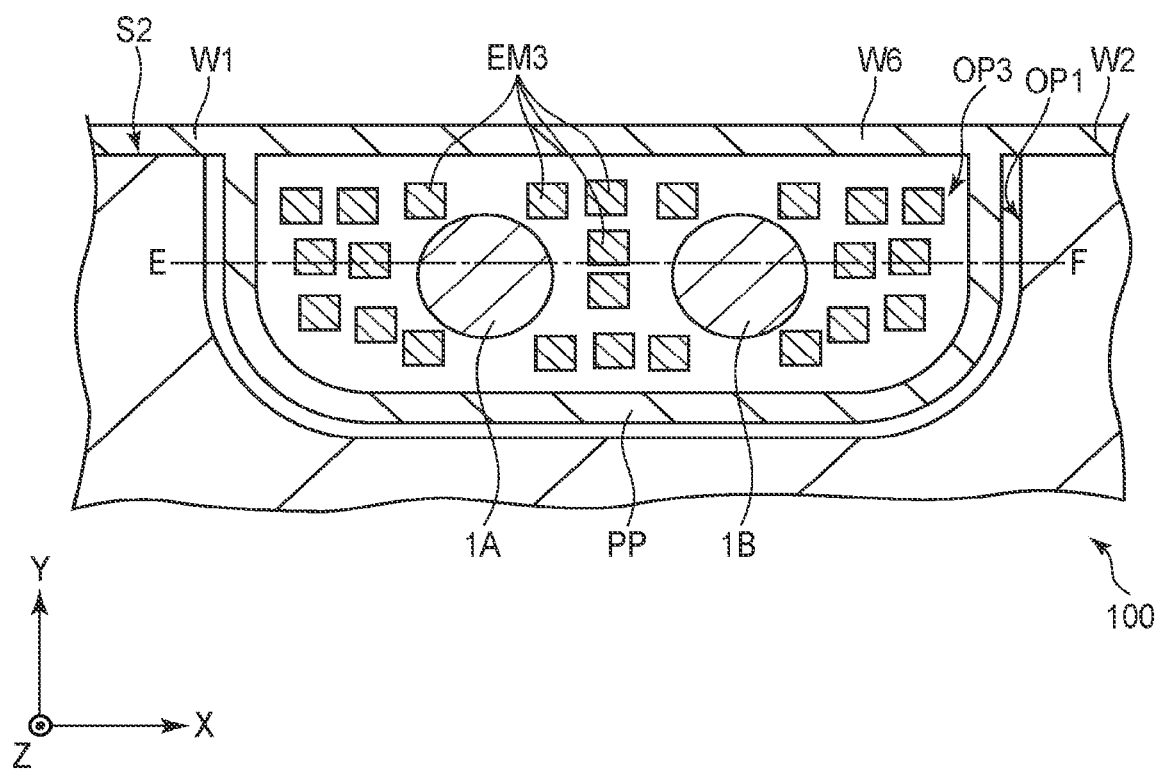
FIG. 11 is a plan view showing still another configuration example of the electronic device 100.

FIG. 11 is a plan view showing another configuration example of the electronic device 100. The configuration example shown in FIG. 11 is different from that of FIG. 9 in the respect that a number of light sources EM3 are provided in the opening OP3. In the example illustrated, the light sources EM3 are provided around the camera 1A and the sensor 1B.

FIG. 12 is a cross-sectional view of the electronic device 100 taken along line E-F shown in FIG. 11. The light sources EM3 each comprise a light-emitting surface 3F opposing the liquid crystal element LCD. As in the case of the light sources EM1 and EM2 shown in FIG. 9, the light sources EM3 are smaller than the light sources EMA, and further smaller than the light sources EM1 and EM2. In the electronic device 100 of such a configuration example, the example of controlling described with reference to FIG. 10 can be applied, an explanation of which is omitted.

In the configuration examples shown in FIGS. 11 and 12 as well, advantageous effects similar to those of the configuration example shown in FIG. 10 can be obtained. Further, with the structure in which the light sources EM3 are disposed around the camera 1A and around the sensor 1B, the region overlapping the opening OP3 can be illuminated without inclining the light-emitting surfaces 3F of the light sources EM3, and also the nonuniformity of the luminance of the illumination light can be reduced.

In such a configuration example, the light sources EM3 are equivalent to the second light source.

Figure 13:
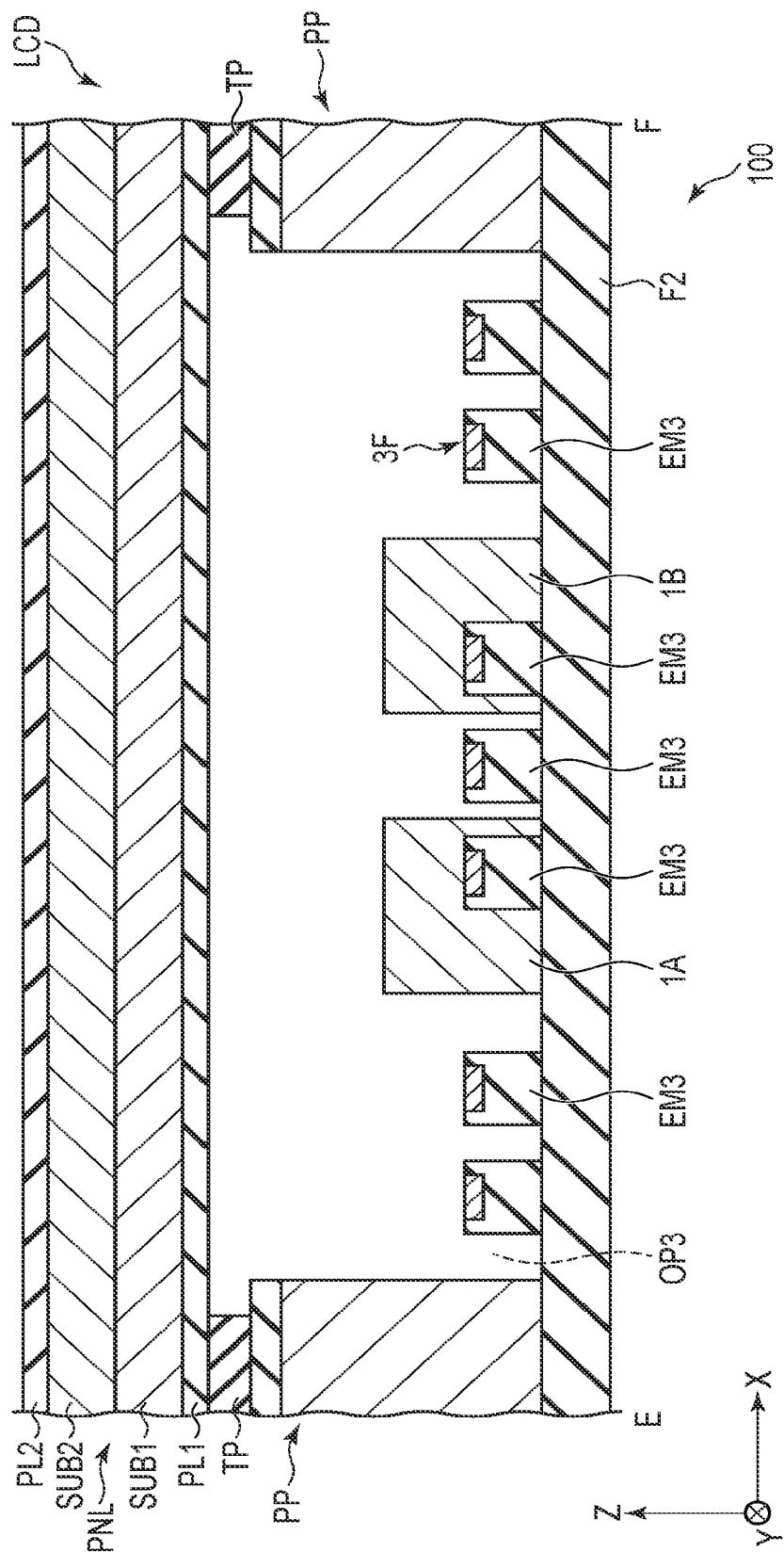
FIG. 13 is a cross-sectional view showing still another configuration example of the electronic device 100.

FIG. 13 is a cross-sectional view showing another configuration example of the electronic device 100. The configuration example shown in FIG. 13 is different from that of FIG. 12 in the respect that the light sources EM3 are provided not only around the camera 1A and the sensor 1B but also inside the camera 1A and the sensor 1B. Thus, a more number of light sources EM3 can be uniformly arranged in the opening OP3 than in the configuration example shown in FIG. 12.

In the configuration example shown in FIG. 13 as well, advantageous effects similar to those of the configuration examples described above can be obtained. In addition, the light sources EM3 are provided inside the camera 1A and the sensor 1B, and therefore illumination light of substantially uniform luminance can be generated in the opening OP3 without providing the scattering control element ST. Further, if the scattering control element ST can be omitted, the number of parts can be reduced, and also the control can be simplified.

Figure 14:
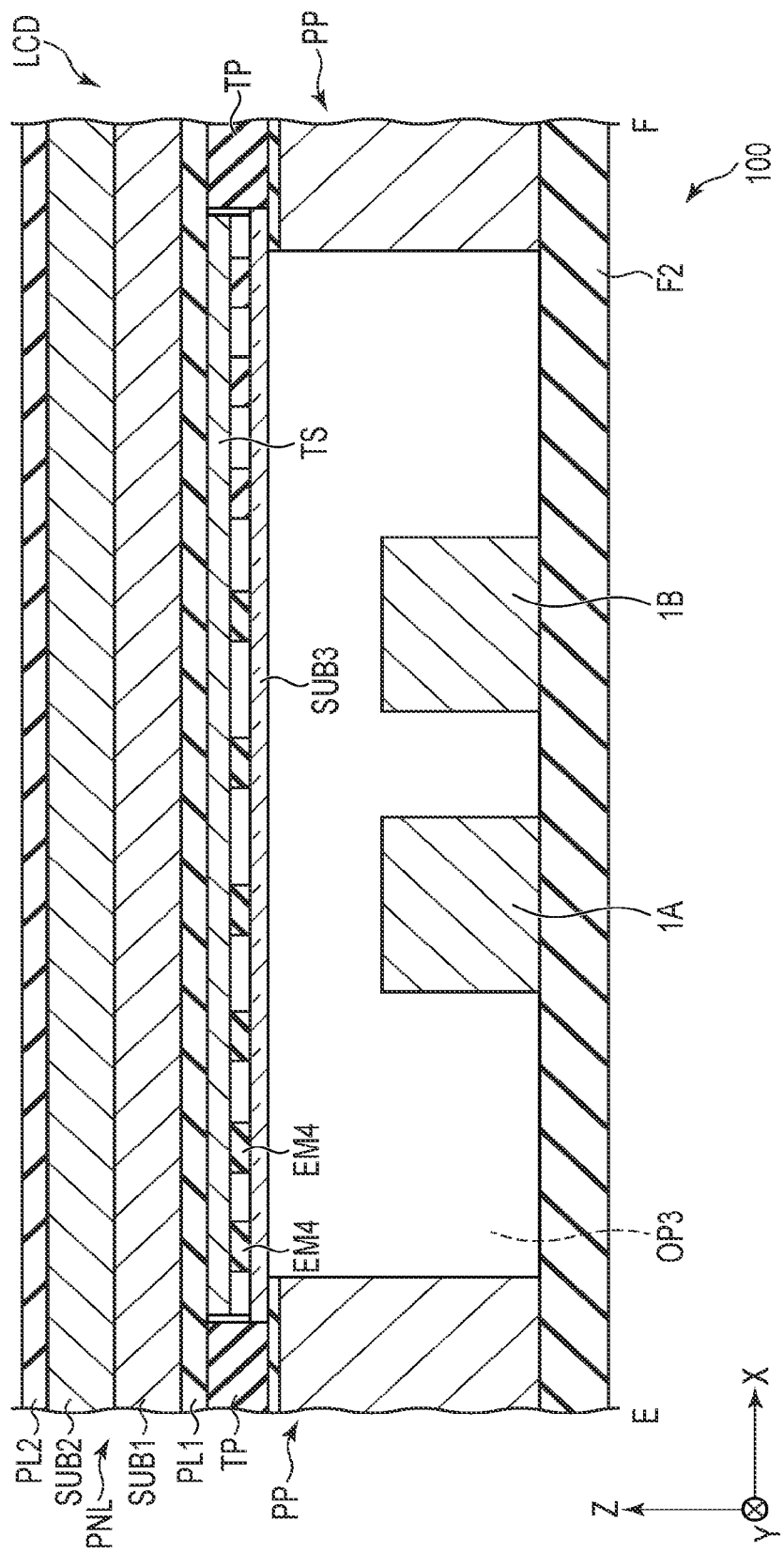
FIG. 14 is a cross-sectional view showing still another configuration example of the electronic device 100.

FIG. 14 is a cross-sectional view showing another configuration example of the electronic device 100. The configuration example shown in FIG. 14 is different from the configuration example described above in the respect that light sources EM4 are provided as the second light source between the camera 1 and sensor 1B and the liquid crystal panel PNL, and a wavelength conversion element TS is provided between the light sources EM4 and the liquid crystal panel PNL. The light sources EM4 are provided in the transparent supporting substrate SUB3. In a region where the camera 1A and the sensor 1B overlap each other, it is preferable that the light sources EM4 are disposed more sparsely than around the camera 1A and the sensor 1B. The wavelength conversion element TS should preferably be colorless because it overlaps the camera 1A and the sensor 1B.

For example, the light sources EM4 emit blue light and ultraviolet light and the wavelength conversion element TS absorbs the light from the light sources EM4 and emits light of a wavelength longer than that of the absorbed light. The wavelength conversion element TS includes, for example, quantum dots as a light-emitting material, but, the example is not limited to this, and it may include a material which emits fluorescence or phosphorescence.

For example, the light sources EM4 emit light of an ultraviolet wavelength (that is, excitation light). The wavelength conversion element TS absorbs excitation light and emits light in blue, green and red, thus producing white illumination light.

In another example, the light sources EM4 emit light of a blue wavelength (that is, excitation light). The wavelength conversion element TS absorbs the excitation light and emits light in yellow. Thus, white illumination light, which is a mixture of blue light which is unconverted light and yellow light which is converted light, is generated.

Note that the case where white light is emitted as illumination light is discussed here. But the example is not limited to this, illumination light of some other color may be emitted.

Figure 15:
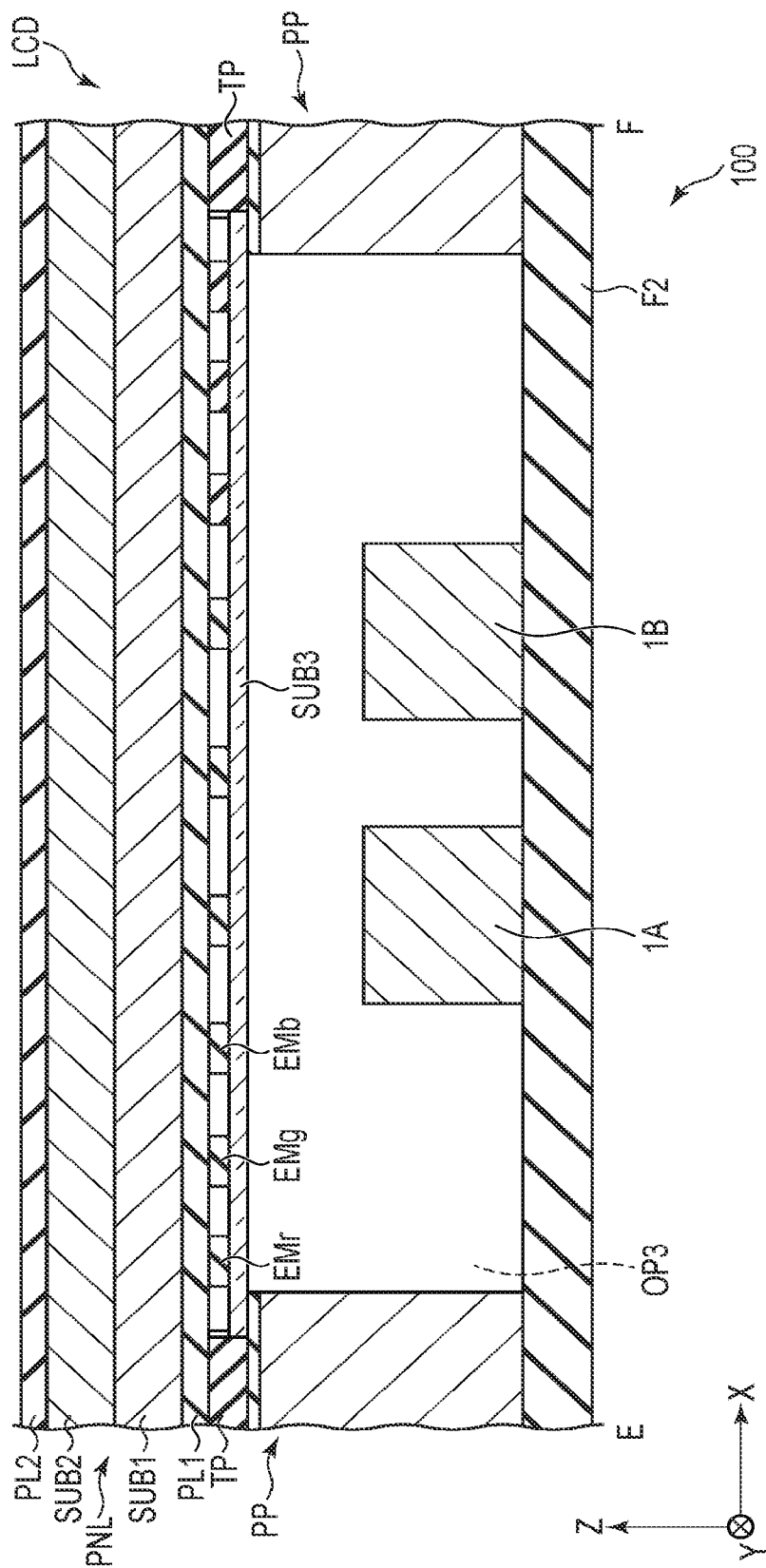
FIG. 15 is a cross-sectional view showing still another configuration example of the electronic device 100.

FIG. 15 is a cross-sectional view showing another configuration example of the electronic device 100. The configuration example shown in FIG. 15 is different from that of FIG. 14 in the respect that a red light source EMr, a green light source EMg and a blue light source EMb are provided as the second light source. The light sources EMr, EMg and EMb are provided in the transparent support substrate SUB3. It is preferable that the light sources EMr, EMg and EMb be displaced sparsely in a region overlapping the camera 1A and the sensor 1B. Further, when the light sources EMr, EMg and EMb are equal in size to the pixels of the liquid crystal element LCD, an opening (a notch or through hole) which overlaps the opening OP3 may be formed in the liquid crystal element LCD, and in the region overlapping the opening OP3, color images can be displayed by controlling the luminance of the light sources EMr, EMg and EMb.

Further, in the configuration example described with reference to FIG. 1 and the like, the light sources EM are provided in the opening OP1 of the light guide LG as in the configuration examples described with reference to FIGS. 8 to 15. Thus, the region overlapping the opening OP1 can be illuminated, and images can be displayed in the area A2.

As discussed above, according to the present embodiment, an illumination unit which can reduce the non-uniformity of the luminance of the illumination light and an electronic device which incorporates this unit, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a liquid crystal panel;
an illumination unit which illuminates the liquid crystal panel;
a camera overlapping the liquid crystal panel and receiving light via the liquid crystal panel; and
a sensor overlapping the liquid crystal panel and sensing through the liquid crystal
panel, the illumination unit comprising;
    a light guide comprising a first side surface, a main surface opposing the liquid crystal panel and an opening made by a notch or a through hole;
    a first light source opposing to the first side surface; and
    a second light source provided closer to the opening than to the first light source;
wherein
the camera is provided in the opening, and
the sensor is provided in the opening.

2. The device of claim 1, further comprising:
a wiring substrate,
wherein
at least one of the camera and the sensor, and the second light source is electrically connected to the wiring substrate.

3. An electronic device comprising:
a liquid crystal panel;
an illumination unit which illuminates the liquid crystal panel; and
a camera overlapping the liquid crystal panel and receiving light via the liquid crystal panel,
the illumination unit comprising:
    a light guide comprising a first side surface, a main surface opposing the liquid crystal panel and an opening made by a notch or a through hole;
    a first light source opposing to the first side surface; and
    a second light source provided closer to the opening than to the first light source;
wherein
the camera is provided in the opening,
the opening is a notch, and
the second light source is provided in the opening.

4. An electronic device comprising:
a liquid crystal panel;
an illumination unit which illuminates the liquid crystal panel, the illumination unit comprising:
    a light guide comprising a first side surface, a main surface opposing the liquid crystal panel and an opening made by a notch or a through hole:
    a first light source opposing to the first side surface; and
    a second light source provided closer to the opening than to the first light source;
a camera overlapping the liquid crystal panel and receiving light via the liquid crystal panel; and
a scattering control element located between the liquid crystal panel and the second light source,
wherein
the camera is provided in the opening,
the second light source comprises a light-emitting surface opposing the liquid crystal panel,
a normal of the light-emitting surface is inclined so as to cross a region of the liquid crystal panel, which is directly above the camera, and
the scattering control element is configured to switch over between a transparent state and a scattering state.

5. An electronic device comprising:
a liquid crystal panel,
an illumination unit which illuminates the liquid crystal panel; and
a camera overlapping the liquid crystal panel and receiving light via the liquid crystal panel,
the illumination unit comprising:
    a light guide comprising a first side surface, a main surface opposing the liquid crystal panel and an opening made by a notch or a through hole;
    a first light source opposing to the first side surface; and
    a second light source provided closer to the opening than to the first light source;
wherein
the camera is provided in the opening, and
the second light source is provided inside the camera.

6. An electronic device comprising;
a liquid crystal panel;
an illumination unit which illuminates the liquid crystal panel; and
a camera overlapping the liquid crystal panel and receiving light via the liquid crystal panel,
the illumination unit comprising:
    a light guide comprising a first side surface, a main surface opposing the liquid crystal panel and an opening made by a notch or a through hole;
    a first light source opposing to the first side surface; and
    a second light source provided closer to the opening than to the first light
source;
wherein
the camera is provided in the opening; and
the second light source is provided between the camera and the liquid crystal panel.

7. The device of claim 6, further comprising:
a. wavelength conversion element located between the second light source and the liquid crystal panel,
wherein
the wavelength conversion element converts a wavelength of light from the second light source into another wavelength.

8. An electronic device comprising:
a liquid crystal panel; and
an illumination unit which illuminates the liquid crystal panel,
the illumination unit comprising:
- a light guide comprising a first side surface, a main surface opposing the liquid crystal panel and an opening made by a notch or a through hole;
- a first light source opposing to the first side surface; and
- a second light source provided closer to the opening than to the first light source;

wherein
the opening is a notch, and
the second light source is provided in the opening.

9. The device of claim 8, further comprising:
a scattering control element located between the liquid crystal panel and the second light source,
wherein
the scattering control element is configured to switch over between a transparent state and a scattering state.

* * * * *